United States Patent [19]

Braun et al.

[11] 3,845,445

[45] Oct. 29, 1974

[54] MODULAR HALL EFFECT DEVICE

[75] Inventors: Roland J. Braun, Vestal; Harry C. Kuntzleman, Newark Valley; Herbert E. Meier, Vestal, all of N.Y.

[73] Assignee: International Business Machines Corporation, Armonk, N.Y.

[22] Filed: Nov. 12, 1973

[21] Appl. No.: 415,203

[52] U.S. Cl. .............................. 338/32 H, 323/94 H

[51] Int. Cl. .............................................. H01c 7/16

[58] Field of Search ....... 338/32 R, 32 H; 323/94 H; 324/45; 340/656; 335/1; 317/235 H

[56] References Cited

UNITED STATES PATENTS

| | | | |
|---|---|---|---|
| 3,137,160 | 6/1964 | Mathias | 324/45 X |
| 3,373,391 | 3/1968 | Bohm et al. | 338/32 H |
| 3,667,000 | 5/1972 | Bergmans | 317/235 H |

*Primary Examiner*—C. L. Albritton
*Attorney, Agent, or Firm*—Gerald R. Gugger

[57] ABSTRACT

An integrated circuit Hall chip is mounted on a ferro magnetic flux concentrator plate and contained within a cavity in a plastic housing. Another ferro magnetic flux concentrator member extends into the cavity and is in alignment with the Hall chip but spaced therefrom by an air gap. A U-shaped ferro magnetic core flux concentrator is positioned against the other side of the flux concentrator plate. The legs of the core extend through the housing and the flux concentrator member, Hall chip and flux concentrator plate are located between the core legs. This arrangement of flux concentrators provides a closed magnetic flux path with an effective magnetic air gap of only slightly more than the chip thickness.

11 Claims, 6 Drawing Figures

MODULAR HALL EFFECT DEVICE

BACKGROUND OF THE INVENTION

A Hall effect device comprises a plate of semiconductor compound of high carrier mobility provided with current supply and Hall voltage electrodes and leads connected to said electrodes. The magnetic field sensitivity of a Hall device varies inversely with the magnetic reluctance of the total flux path in directions perpendicular to the semiconductor plate. Thus, the smaller the magnetic reluctance, the greater the sensitivity and the greater the amount of flux concentration on the semiconductor plate in its area between the electrodes. In Hall effect device packages for use in such applications as magnetic switching, proximity sensing, and current sensing, it is desirable to have the highest degree of flux concentration possible to provide a highly sensitive device. In such devices, the smaller the air gap in the magnetic circuit the higher the flux concentration in the gap. The reduction of the total air gap is generally accomplished by the use of flux concentrators. However, Hall effect device packages available to date lack flux concentrators that reduce the air gap to the desired minimum of the Hall chip thickness.

SUMMARY OF THE INVENTION

In the modular Hall effect device of the present invention, a plastic housing is provided having a cavity therein and in the cavity is an integrated circuit Hall chip which is mounted on ferro magnetic flux concentrator carrier plate. Above the chip there is positioned a T-shaped ferro magnetic flux concentrator member which extends from the top of the housing down into the cavity and which is in alignment with the Hall chip but spaced therefrom by a small air gap. Inserted into the bottom of the housing and up against the flux concentrator carrier plate is a U-shaped ferro magnetic core flux concentrator. The legs of the core extend upward to the top surface of the housing and the T-shaped flux concentrator, Hall chip, and flux concentrator carrier plate are located between the legs of the U-shaped core. This improved arrangement of flux concentrators in conjunction with an external permanent magnet provides a closed magnetic flux path with an effective magnetic air gap of only slightly more than the chip thickness. For some applications, such as switching and current sensing, the total air gap is no more than the thickness of the Hall chip plus the air gap thickness between the chip and the T-shaped flux concentrator and in the present arrangement this total air gap is about 0.020 inches. For other applications, the total air gap would be increased only by the gap between the external magnet means and the top of the housing.

Mounting of the Hall chip on the ferro magnetic flux concentrator carrier plate provides for cooling, stress isolation, and maximum flux density between the plate and the T-shaped flux concentrator. Additionally, a heat sink effect is provided which will allow operation of the chip at higher voltages than would otherwise be possible. This is desirable since the Hall sensitivity increases proportionally with the supply voltage.

The present package construction permits close tolerance positioning of the flux concentrators to the chip Hall area.

Also, the present construction provides a basic Hall effect module which can be used at the basic building block for different Hall transducer packages for switching, proximity sensing and current sensing applications.

Accordingly, a principle object of the present invention is to provide a Hall effect device having a novel and improved arrangement of flux concentrators.

A further object of the present invention is to provide a Hall effect device having a novel and improved arrangement of flux concentrators which provides a closed magnetic flux path with an effective magnetic air gap of only slightly more than the chip thickness.

A still further object of the present invention is to provide a novel and improved Hall effect module which can be used as the basic building block for different Hall transducers packages.

A further object of the present invention is to provide a Hall effect device having a novel and improved arrangement of flux concentrators one of which is a U-shaped core to provide a closed magnetic flux path with a minimum effective magnetic air gap.

Another object of the present invention is to provide a Hall effect package that permits close tolerance positioning of the flux concentrators to the chip Hall area.

The foregoing and other objects, features and advantages of the invention will be apparent from the following more particular description of preferred embodiments of the invention as illustrated in the accompanying drawings.

DESCRIPTION OF PREFERRED EMBODIMENTS

Figure 1:
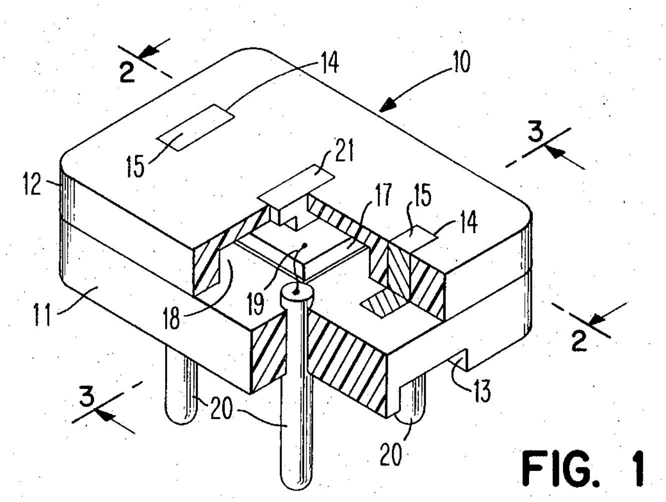
FIG. 1 is an isometric view with a portion broken away showing a Hall effect device constructed in accordance with the present invention.
Figure 2:
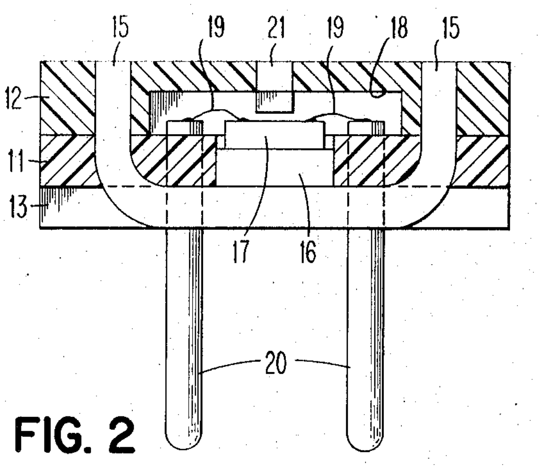
FIG. 2 is a sectional view taken generally along line 2 2 of FIG. 1.
Figure 3:
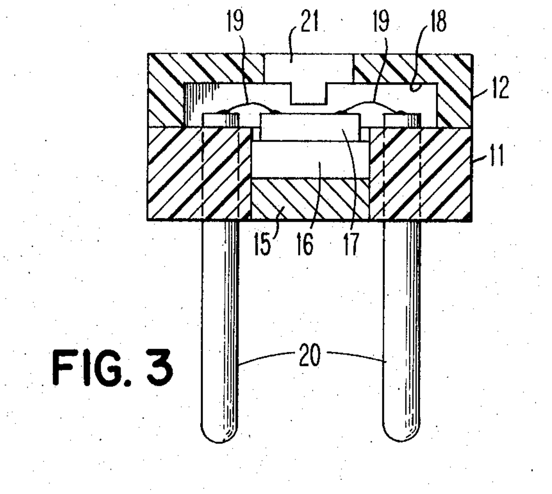
FIG. 3 is a sectional view taken generally along line 3—3 of FIG. 1.

Referring to FIGS. 1, 2 and 3, the Hall effect Module 10 comprises a housing having a base section 11 and a top section 12 which are joined together by ultrasonic welding or by any other suitable means. Sections 11 and 12 are preferably molded from plastic material, and in the present embodiment the dimensions of the module are 0.085 × 0.180 × 0.260 inches.

A groove 13 extends across the underside of base section 11 and two rectangular holes 14 extend from the top of the housing to the groove. The groove and holes are adapted to receive a U-shaped flux concentrator core insert 15 which is made of soft iron. Mounted in the base section 11 and seated directly on the core 15 is a soft iron carrier plate insert 16 which also serves as a flux concentrator. Bonded directly to the carrier plate 16 by a suitable elastic epoxy is an integrated circuit Hall semiconductor chip 17 which in the present embodiment has maximum dimensions of 0.060 × 0.070 × 0.016 inches. The Hall chip extends into a cavity 18 in the bottom of top section 12 and the chip is provided with four flying leads 19 which connect the current and voltage electrodes of the chip to four terminal pins 20 mounted in the bottom section 11. Mounted in the top section 12 is a T-shaped soft iron flux concentrator insert 21 which extends into the cavity and is in alignment with the Hall chip but is spaced therefrom by a small air gap. The cavity 18 may be filled with silgard or similar material to dampen any lead vibrations. The flux concentrators and terminal pins may be inserted ultra-sonically to simplify the molding process of the module.

The mounting of the Hall chip directly to the iron carrier plate 16 will provide not only low magnetic reluctance but also maximum heat conductance for cooling the chip, while minimizing the stress in the chip. It should be understood, however, that if it is desired not to use the carrier plate 16, the Hall chip may be mounted directly to the inside surface of the base portion of the U-shaped core insert 15 and extend into the cavity.

The construction of the module and arrangement of the flux concentrators and particularly the use of the U-shaped core 15 produces a significantly improved Hall effect device which allows the realization of a closed flux path between the two ends of the U-shaped core and the center top with an effective air gap almost as small as the thickness of the Hall chip. This increases the sensitivity considerably over an open flux path design and allows very small transducers and switch designs, and implementation of a low level current sensor with zero d c load on the monitored circuit.

Figure 4:
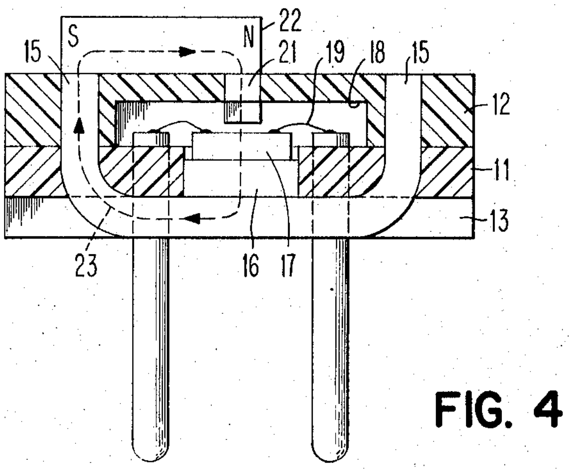
FIG. 4 is the same as FIG. 2 with the addition of an external permanent magnet to provide a switch.

Referring to FIG. 4, there is illustrated the use of the present module with an external permanent magnet to perform a switching function. The permanent magnet 22 is slideable along the top surface of the module and in the position shown the S pole of the magnet is in contact with the left leg of core 15 and N pole is in contact with the flux concentrator 21. In this position, flux will flow down through the Hall chip and in a path indicated by the dotted line 23 to generate a Hall voltage of one polarity. It will be noted that the use of core 15 results in a closed flux path with a total effective air gap which is limited to the thickness of chip 17 plus the air gap between the chip and flux concentrator 21. In the present embodiment, this total air gap is only about 0.020 inches. Movement of the magnet to the right to a position where the N pole is in contact with the right leg of core 15 and the S pole is in contact with flux concentrator 21 will result in a flow of flux down to right leg of the core and up through the Hall chip to generate a Hall voltage of opposite polarity. The flux path will be closed in the same manner as before.

Figure 5:
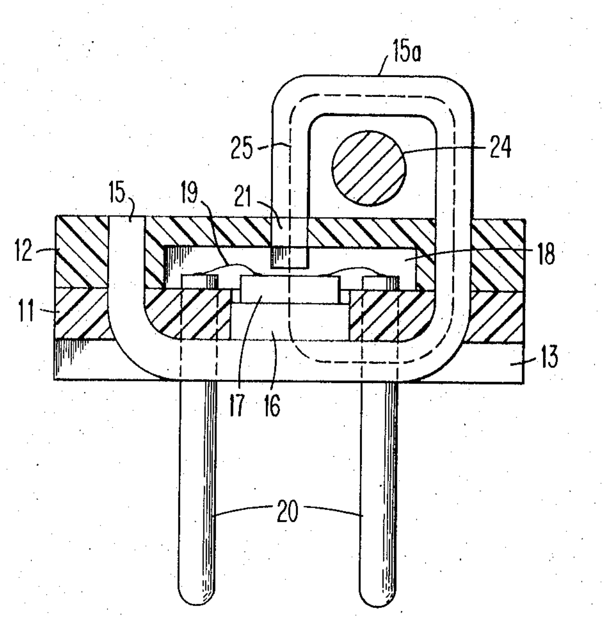
FIG. 5 shows a modification of the device of FIGS. 1, 2 and 3 to provide a current sensor.

Referring to FIG. 5, there is shown the present module modified slightly to provide a current sensing device. The modification consists of making one leg of the U-shaped core 15 longer and bending it to form an external loop portion 15*a* which is suitably connected directly to the flux concentrator 21. This arrangement provides an extremely closed flux loop for sensing currents. The current flowing in a conductor 24 positioned within the external flux loop portion 15a will generate a magnetic field which causes a magnetic flux to be induced in the loop. The flux will flow through the Hall chip 17 and in a path indicated by the dotted line 25. It will be noted that the use of core 15 and the external loop portion results in a closed flux path with a total effective air gap which is limited to the thickness of chip 17 plus the air gap between the chip and flux concentrator 21. This total air gap is only about 0.020 inches.

Figure 6:
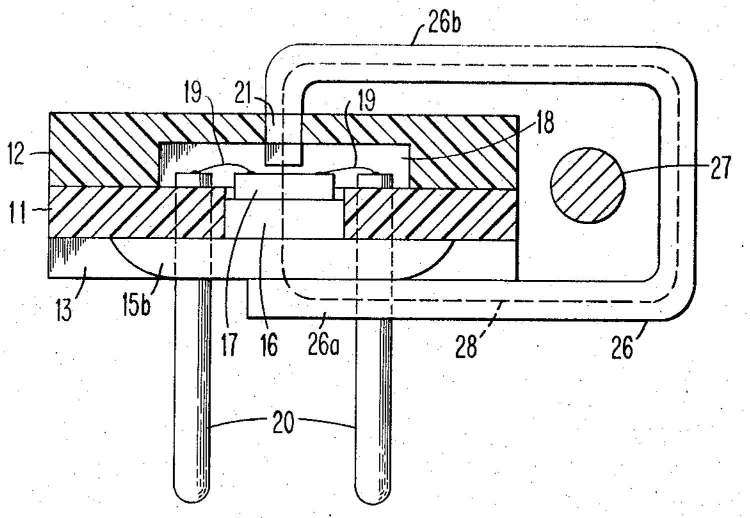
FIG. 6 shows another modification of the device of FIGS. 1, 2 and 3 to provide a current sensor.

In the modification shown in FIG. 6, the current sensor is made by adding an external U-shaped ferro magnetic member 26 to the basic module. Also, the legs of the U-shaped core 15 are removed and only the base or bottom portion 15*b* is used. The U-shaped member 26 is preferably made of soft iron and it has one leg 26*a* suitably connected directly to the underside of the flux concentrator member 15*b* and the end of its other leg 26*b* suitably connected directly to the flux concentrator 21. This arrangement also provides an extremely closed flux loop. With a current carrying conductor 27 positioned within the loop portion of member 26, the flow of flux will be in a path indicated by the dotted line 28 and this path will have the same total effective air gap as the one just described above.

In some applications, such as proximity sensing, the total effective air gap may increase but only an amount equal to the distance between the module and the external magnetic field source being sensed.

While the invention has been particularly shown and described with reference to preferred embodiments thereof, it will be understood by those skilled in the art that various changes in form and details may be made therein without departing from the spirit and scope of the invention.

What is claimed is:

1. A Hall effect device comprising:

a housing of non-magnetic material having a cavity therein;

a carrier plate insert member of magnetic material positioned adjacent to said cavity;

a Hall semiconductor chip mounted on said carrier plate and extending into said cavity;

a second insert member of magnetic material connecting one outside surface of the housing with said cavity, said second member extending into the cavity in alignment with said chip but spaced therefrom by an air gap; and a third insert member of magnetic material connecting said carrier plate with said one outside surface of the housing, said carrier plate and second and third members providing in conjunction with an external permanent magnet a closed magnetic flux path with a total effective magnetic air gap of only slightly more than the thickness of said chip.

2. A Hall effect device comprising:

a housing of non-magnetic material having a cavity therein;

a carrier plate insert member of magnetic material positioned adjacent to said cavity;

a Hall semiconductor chip mounted on said carrier plate and extending into said cavity;

a second insert member of magnetic material connecting one outside surface of the housing with said cavity, said second member extending into the cavity in alignment with said chip but spaced therefrom by an air gap; and a third U-shaped insert member of magnetic material positioned in contact with said carrier plate and having its legs extending through the housing to said one outside surface of the housing, said carrier plate and second and third members providing in conjunction with an external permanent magnet a closed magnetic flux path with a total effective magnetic air gap of only slightly more than the thickness of said chip.

3. A Hall effect device comprising:

a housing of non-magnetic material having a cavity therein;

a U-shaped flux concentrator insert of magnetic material having its base portion extending across a portion of the housing and its two leg portions extending through the housing to one outside surface thereof;

a carrier plate flux concentrator insert of magnetic material positioned between the leg portions and in contact with the base portion of said U-shaped insert;

a Hall semiconductor chip mounted on said carrier plate and extending into said cavity; and a third flux concentrator insert of magnetic material which extends from said one outside surface of the housing into said cavity in alignment with said chip but spaced therefrom by an air gap, said flux concentrator inserts being effective when coupled with external magnet means to provide a closed magnetic flux path with a total effective magnetic air gap of the thickness of said chip plus the air gap between the chip and said third flux concentrator.

4. A Hall effect device as in claim 3 having terminal pins which extend partially into said cavity, and leads connecting said pins with current and voltage electrodes on said Hall chip.

5. A Hall effect device as in claim 3 wherein the non-magnetic material of said housing is plastic and the magnetic material of said inserts is iron.

6. A Hall effect device as in claim 3 wherein said one outside surface of the housing is adapted to slideably support a magnet.

7. A Hall effect device comprising:

a housing of non-magnetic material;

a cavity in the central portion of said housing;

a U-shaped flux concentrator insert of magnetic material having its base portion extending across the bottom portion of the housing and its two leg portions extending up through the housing to the top outside surface thereof;

a carrier plate flux concentrator insert of magnetic material positioned between the leg portions and in contact with the inner surface of the base portion of said U-shaped insert;

a Hall semiconductor chip mounted on said carrier plate and extending into said cavity; and a third flux concentrator insert of magnetic material which extends from said top outside surface of the housing into said cavity in alignment with said chip but spaced therefrom by an air gap.

8. A Hall effect device as in claim 7 wherein said top outside surface of the housing is substantially flat and the ends of the legs of said U-shaped insert and one end of said third insert are flush with said surface.

9. A Hall effect device comprising:

a housing of non-magnetic material;

a cavity in the central portion of said housing;

a U-shaped flux concentrator insert of magnetic material having its base portion extending across the bottom portion of the housing and its two leg portions extending up through the housing to the top outside surface thereof;

a Hall semiconductor chip positioned between the leg portions and in contact with the inner surface of the base portion of said U-shaped insert, said Hall chip extending into said cavity; and a second flux concentrator insert of magnetic material which extends from said top outside surface of the housing into said cavity in alignment with said chip but spaced therefrom by an air gap.

10. A Hall effect device for sensing current flowing in a conductor which comprises:

a housing of non-magnetic material having a cavity therein;

a carrier plate insert member of magnetic material positioned adjacent to said cavity;

a Hall semiconductor chip mounted on said carrier plate and extending into said cavity;

a second insert member of magnetic material connecting one outside surface of the housing with said cavity, said second member extending into the cavity in alignment with said chip but spaced therefrom by an air gap; and a third U-shaped flux concentrator insert member of magnetic material positioned with its base portion in contact with said carrier plate and having one of its legs extending through said outside surface of the housing and being formed with an external loop portion which is connected directly to said second insert member, said loop portion being adapted to receive a current carrying conductor and said insert members providing a closed magnetic flux path with a total effective magnetic air gap of the thickness of said chip plus the air gap between the chip and said second insert member.

11. A Hall effect device for sensing current flowing in a conductor which comprises:

a housing of non-magnetic material having a cavity therein;

a carrier plate insert member of magnetic material positioned adjacent to said cavity;

a Hall semiconductor chip mounted on said carrier plate and extending into said cavity;

a second insert member of magnetic material connecting one outside surface of the housing with said cavity, said second member extending into the cavity in alignment with said chip but spaced therefrom by an air gap;

a third member of magnetic material positioned along an outside surface of said housing opposite to said one outside surface and in contact with said carrier plate; and an external U-shaped member of magnetic material having one leg connected directly to said third member and its other leg connected directly to said second member, the base portion of said external U-shaped member forming an external loop portion which is adapted to receive a current carrying conductor and said carrier plate, second and third members, and said external U-shaped member providing a closed magnetic flux path with a total effective magnetic air gap of the thickness of said chip plus the air gap between the chip and said second insert member.

* * * * *